(12) United States Patent
Grant

(10) Patent No.: US 11,621,837 B2
(45) Date of Patent: Apr. 4, 2023

(54) SECURE ENCRYPTION OF DATA USING PARTIAL-KEY CRYPTOGRAPHY

(71) Applicant: Theon Technology LLC, Newport Beach, CA (US)

(72) Inventor: Robert Edward Grant, Laguna Beach, CA (US)

(73) Assignee: Theon Technology LLC, Newport Beach, CA (US)

(*) Notice: Subject to any disclaimer, the term of this patent is extended or adjusted under 35 U.S.C. 154(b) by 0 days.

(21) Appl. No.: 17/011,885

(22) Filed: Sep. 3, 2020

(65) Prior Publication Data

US 2022/0069989 A1 Mar. 3, 2022

(51) Int. Cl.
*H04L 9/08* (2006.01)
*H04L 9/32* (2006.01)

(52) U.S. Cl.
CPC .......... *H04L 9/0861* (2013.01); *H04L 9/0825* (2013.01); *H04L 9/0827* (2013.01); *H04L 9/3215* (2013.01)

(58) Field of Classification Search
None
See application file for complete search history.

(56) References Cited

U.S. PATENT DOCUMENTS

| | | | |
|---|---|---|---|
| 5,033,352 A | 7/1991 | Kellogg | |
| 5,764,772 A | 6/1998 | Kaufman | |
| 5,966,445 A | 10/1999 | Park | |
| 6,072,876 A | * 6/2000 | Obata | H04L 9/302 380/282 |
| 6,154,541 A | 11/2000 | Zhang | |
| 6,396,928 B1 | 5/2002 | Zheng | |
| 6,480,605 B1 | 11/2002 | Uchiyama | |
| 6,636,968 B1 | 10/2003 | Rosner | |
| 6,751,736 B1 | 6/2004 | Bowman | |
| 6,763,364 B1 | 7/2004 | Wilber | |
| 6,990,200 B1 | 1/2006 | Kasahara | |
| 7,502,754 B2 | 3/2009 | Campbell | |

(Continued)

FOREIGN PATENT DOCUMENTS

| | | |
|---|---|---|
| EP | 1220174 | 7/2002 |
| EP | 2680488 | 8/2019 |

(Continued)

OTHER PUBLICATIONS

Bhaumik, et al. "Safely Doubling your Block Ciphers for a Post-Quantum World," Inria, Paris. 2020. 49 pages.

(Continued)

*Primary Examiner* — Bassam A Noaman
(74) *Attorney, Agent, or Firm* — Fish IP Law, LLP

(57) ABSTRACT

Systems and methods for securing encrypted data wherein a sending computer encrypts data to be transmitted with an encryption key. The encryption key itself is not sent, but can be derived from a second key and third key. The second key is modified such that an incomplete portion of the second key is sent along with the message to a recipient computer. The third key is sent separately to the recipient computer. The recipient computer obtains the remainder of the second key, reconstructs the complete second key and then uses it with the third key to derive a decryption key to decrypt the message.

10 Claims, 2 Drawing Sheets

(56) References Cited

U.S. PATENT DOCUMENTS

| | | | |
|---|---|---|---|
| 8,468,244 B2 | 6/2013 | Redlich | |
| 8,516,244 B2* | 8/2013 | Waters | H04L 9/3073 726/1 |
| 8,885,820 B1* | 11/2014 | Lambert | H04L 9/0869 380/44 |
| 9,450,749 B2 | 9/2016 | Hammersmith | |
| 9,674,162 B1* | 6/2017 | Miller | G06F 12/1408 |
| 10,230,703 B1 | 3/2019 | Lepore | |
| 10,476,665 B1 | 11/2019 | Griffin | |
| 10,911,451 B2 | 2/2021 | Costa | |
| 11,188,977 B2 | 11/2021 | Youb | |
| 11,443,310 B2 | 9/2022 | Bolla | |
| 2003/0081785 A1* | 5/2003 | Boneh | H04L 9/3073 380/277 |
| 2003/0115449 A1 | 6/2003 | Yochim | |
| 2004/0096056 A1 | 5/2004 | Boren | |
| 2006/0072745 A1* | 4/2006 | Fukaya | G06F 21/606 380/28 |
| 2007/0211893 A1 | 9/2007 | Frosik | |
| 2008/0107274 A1* | 5/2008 | Worthy | G06F 21/602 380/278 |
| 2008/0208560 A1 | 8/2008 | Johnson | |
| 2009/0146851 A1* | 6/2009 | Lablans | G06F 7/503 341/89 |
| 2010/0119061 A1 | 5/2010 | Kawale | |
| 2012/0134495 A1 | 5/2012 | Liu | |
| 2013/0142323 A1 | 6/2013 | Chiarella | |
| 2013/0297937 A1* | 11/2013 | Fransen | H04W 12/04 713/170 |
| 2014/0112469 A1 | 4/2014 | Layne | |
| 2016/0012252 A1 | 1/2016 | Deleeuw | |
| 2016/0014110 A1* | 1/2016 | Kurspahic | H04L 9/085 713/183 |
| 2016/0323736 A1* | 11/2016 | Donahue | H04L 63/061 |
| 2017/0222804 A1* | 8/2017 | Dewitt | H04L 9/0861 |
| 2017/0302446 A1* | 10/2017 | Thorwirth | H04N 21/2347 |
| 2017/0310650 A1 | 10/2017 | McMullen | |
| 2018/0101322 A1 | 4/2018 | Cheriton | |
| 2018/0131526 A1 | 5/2018 | Ellingson | |
| 2019/0036678 A1 | 1/2019 | Ahmed | |
| 2019/0089532 A1* | 3/2019 | Lambert | H04L 63/08 |
| 2019/0120929 A1 | 4/2019 | Meadow | |
| 2019/0238323 A1* | 8/2019 | Bunch | H04L 9/0877 |
| 2020/0084037 A1* | 3/2020 | Zhang | G06F 21/6209 |
| 2020/0241841 A1 | 7/2020 | Tamiya | |
| 2020/0293212 A1 | 9/2020 | Narayanamurthy | |
| 2020/0366652 A1* | 11/2020 | Koyun | H04L 63/045 |
| 2020/0396059 A1 | 12/2020 | Micali | |
| 2023/0007439 A1 | 1/2023 | Williams | |

FOREIGN PATENT DOCUMENTS

| | | |
|---|---|---|
| JP | 2007157288 | 6/2007 |
| JP | 2007336556 | * 12/2007 |
| WO | 0065768 | 11/2000 |
| WO | 2005085992 | 9/2005 |
| WO | 2016203762 | 12/2016 |
| WO | 2019110955 | 6/2019 |

OTHER PUBLICATIONS

"Elliptic Curve Cryptography (Ecc)." 1 page.
"Elliptic Curve Over Finite Non-Prime Fields," Mathematics. 2 pages.
"Golden Ratio Calculator," Good Calculators. 2 pages.
Grant, et al. "Accurate and Infinite Prime Prediction from Novel Quasi-Prime Analytical Methodology." 8 pages.
Grant, Robert E. "Prime Number Pattern Discovery," Discoveries, Publications, Unified Math/Physics. Jul. 2018. 6 pages.
Kumar, et al. "A Symmetric Mecial Image Encryption Scheme Based on Irrational Numbers," Biomed Res 2018 Special Issue S494-S498. 5 pages.
Grant, et al. "Reciprocal Wave Factorization," Strathspey Crown Holdings. Jun. 2020. 19 pages.
Barker, et al. "Recommendation for Pair-Wise Key Establishment Schemes Using Discrete Logarithm Cryptography," NIST. Apr. 2018. 2 pages.
Weisstein, Eric W. "Taniyama-Shimura Conjecture," Mathworld—A Wolfram Web Resource. 3 pages.
Wang, et al. "A Decentralized Electricity Transaction Mode of Microgrid Based on Blockchain and Continuous Double Action," IEEE 2018. 5 pages.
"Why Are Elliptic Curves Constructed Using Prime Fields and Not Composite Fields?" https://crypto.stackexchange.com. 3 pages.
"Why is a Prime Number Used in ECDSA?" https://crypto.stackexchange.com/. 3 pages.
Wu, et al. "Forensic Analysis of Bitcoin Transactions," IEEE. 2019. 3 pages.
Burd, Barry. "A New Approach to Condensing Data Leads to a 99% Compression Rate," TechTarget. May 2015. 9 pages.
Zhang, et al. "A Blockchain-Based Authentication Method with One-Time Password," IEEE, 2019. 9 pages.

* cited by examiner

SECURE ENCRYPTION OF DATA USING PARTIAL-KEY CRYPTOGRAPHY

FIELD OF THE INVENTION

The field of the invention is data security.

BACKGROUND

The background description includes information that may be useful in understanding the present invention. It is not an admission that any of the information provided herein is prior art or relevant to the presently claimed invention, or that any publication specifically or implicitly referenced is prior art.

Data security has long been a concern of computer users everywhere. To protect data, users often rely on encryption schemes. However, encryption schemes suffer from several deficiencies. For example, keys can be intercepted and used by intruders to decrypt the data.

Additionally, the advent of quantum computing means it is only a matter of time until traditional encryption schemes, regardless of key size or whether it employs private keys, are rendered obsolete.

Thus, there is still a need for a reliable, future proof method of securing data for transmission and storage.

SUMMARY OF THE INVENTION

The inventive subject matter provides apparatus, systems and methods in which a message is securely encrypted and transmitted to a receiving device for decryption.

In embodiments of the inventive subject matter, a sending computing device encrypts a message using a first cryptographic key. The message is transmitted to a receiving computing device, along with an incomplete version of a second cryptographic key. The incomplete version of the second cryptographic key can, in embodiments, be a truncated version of the second cryptographic key, a version of the second cryptographic key that is missing interim digits, or a split version of the second cryptographic key. Separately, in a different transmission, the sending computing device transmits a third cryptographic key to the receiving computing device.

The recipient computing device then contacts a service computing device to retrieve the remainder of the second cryptographic key. Upon obtaining the remainder of the second cryptographic key, the recipient computing device then combines the remainder of the second cryptographic key with the previously received incomplete portion to obtain the complete second cryptographic key.

The recipient computing device then uses the complete second cryptographic key and the previously-received third cryptographic key to derive a decryption key that it then uses to decrypt the received encrypted message.

In embodiments of the inventive subject matter, the complete second cryptographic key is a quasi-prime number. In these embodiments, the incomplete portion of the second cryptographic key and the remainder of the cryptographic key are prime numbers that are the factors of the quasi-prime number.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
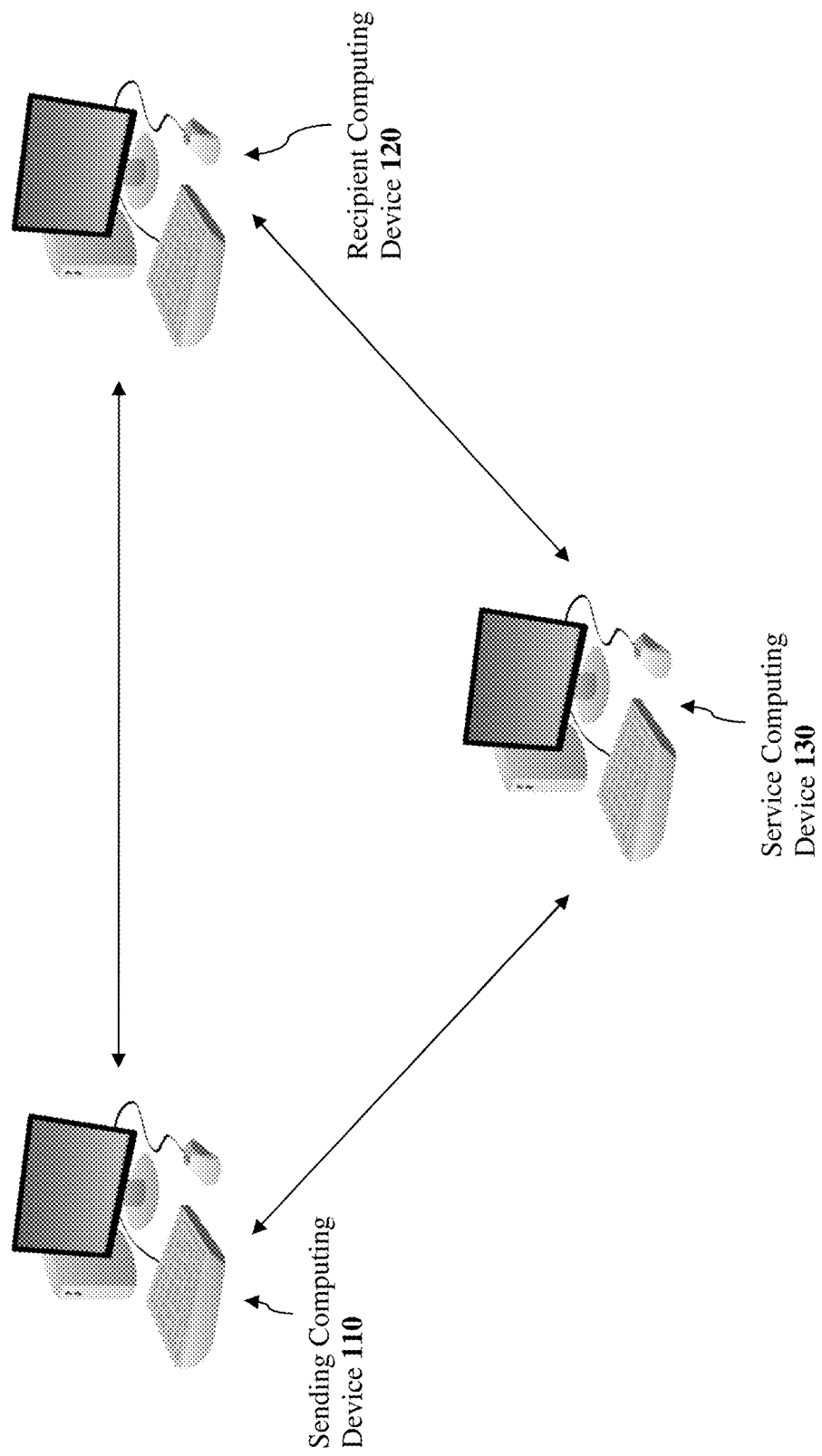
FIG. 1 is a diagrammatic overview of the system according to embodiments of the inventive subject matter.

FIG. 1 provides a diagrammatic overview of the system 100 according to embodiments of the inventive subject matter.

As seen in FIG. 1, the system 100 includes a sending computing device 110, a receiving computing device 120, and a service computing device 130.

Each of the sending computing device 110, the receiving computing device 120, and service computing device 130 can be one or more computing devices that include a processor, a non-transitory computer readable medium that stores instructions that the processor executes to carry out the various functions discussed herein, and data exchange capabilities that allow each computing device 110, 120, 130 to exchange data over a data exchange network (wired or wireless).

Figure 2:
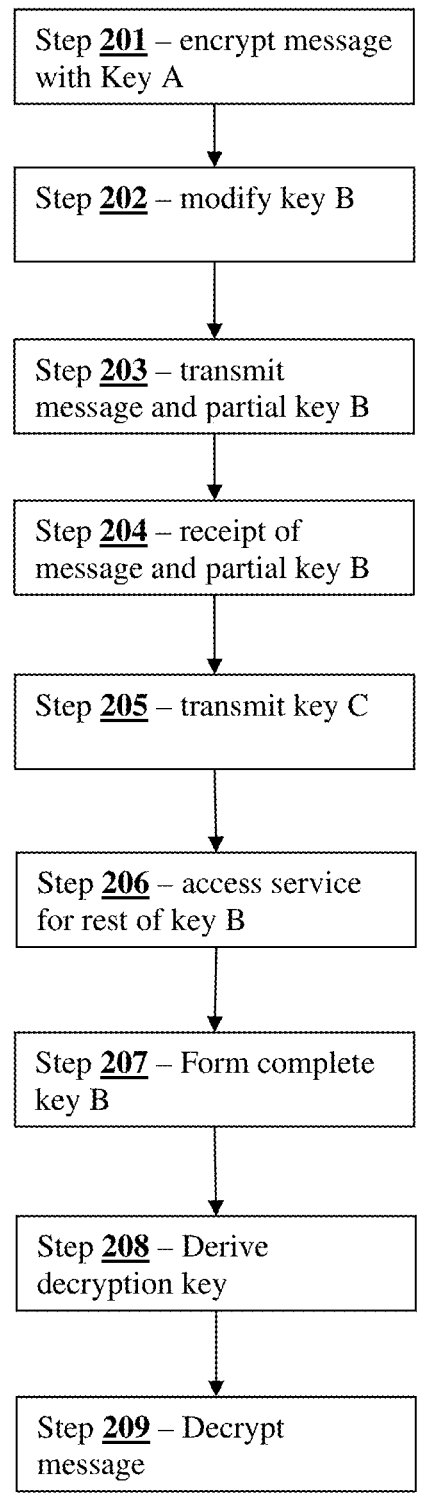
FIG. 2 provides a flowchart of the methods executed by the various participants of the system, according to embodiments of the inventive subject matter.

FIG. 2 provides a flowchart of the methods executed by the various participants of the system, according to embodiments of the inventive subject matter.

At step 201, the sending computing device that is to send a message uses a first cryptographic key ("Key A") to encrypt the message.

Key A is a cryptographic key that can be derived from the combination of a second cryptographic key ("Key B") and a third cryptographic key ("Key C").

The sender then modifies "Key B" at step 202. To modify Key B, the sending computing device can split Key B into sections such that it results in an incomplete version of Key B. Thus, in this example, the incomplete version of Key B is a split portion/version of Key B. The incomplete version of Key B can, in other embodiments, be a truncated version of the Key B, a version of Key B that is missing interim digits, or an otherwise modified version of Key B.

In embodiments, the modification of Key B by the sending computing device 110 can be according to a pre-determined scheme or function. In these embodiments, the same or mirroring scheme or function can be used to derive the missing/remainder parts of key B.

At step 203, the sending computing device 110 transmits the encrypted message as well as the incomplete portion of Key B to the recipient computing device 120.

At step 204, the recipient computing device 120 receives the encrypted message as well as the incomplete cryptographic key B from the sending computing device 110.

At step 205, the sending computing device 110 transmits a third cryptographic key—Key C—to the recipient computing device 120. The transmission of step 205 is a separate transmission from the transmission of step 204. As such, the transmission of Key C at step 205 can occur before, after or simultaneously with the transmission of step 204.

At step 206, the recipient computing device 120 accesses service computing device 130 to get the remainder of the cryptographic key B.

The service computing device 130 stores and/or derives the remainder of cryptographic key B, so that it can send it to the recipient computing device 120 upon request.

In embodiments, the service computing device 130 receives, at some point prior to step 206, the remainder of cryptographic key B from the sending computing device 110. In these embodiments, the sending computing device 110 derives the remainder of the cryptographic key B. This remainder can be the outcome of the modification of step 202 or can be calculated prior to the process starting.

In other embodiments, the service computing device 130 derives the remainder of the cryptographic key B on its own. For example, the service computing device 130 can receive the complete cryptographic key B at a prior time from the sending computing device 110 and then apply the same modification process to the key B that the sending computing device 110 uses at step 202, and instead of keeping the incomplete portion of key B, the service computing device 130 instead retains the remainder of the key B, deleting the incomplete portion of key B.

In embodiments, the remainder of key B changes over time. In these embodiments, the service computing device 130 is programmed to periodically change the remainder of key B according to a pre-determined schedule and scheme shared with the sending computing device 110. In these embodiments, the incomplete portion and remainder of key B are considered to be the inputs to a function that results in the complete key B. As such, in these embodiments, the sending computing device 110 also changes the incomplete portion of key B according to the scheme prior to sending it to the receiving computing device 120 such that function to generate key B using the changed incomplete portion of key B and the changed remainder of key B as inputs still results in the complete key B. For example, if the complete key B is a product of the incomplete portion of key B and the remainder of key B (and as such, the incomplete portion of key B and the remainder of key B are factors of the complete key B), the service computing device 130 changes the remainder of key B to a different factor of the complete key B according to the schedule. Sending computing device 110, in turn, also changes the incomplete portion of key B to a corresponding factor of the complete key B such that, when the receiving computing device 120 obtains both the changed incomplete portion of key B and the changed remainder of key B, both of these portions then can be used to derive the complete key B.

By changing the portions of the cryptographic key B according to the schedule, an additional layer of security is added because a time sensitivity is added to the reassembly of key B by the receiving computing device 120. If the receiving computing device 120 waits too long to obtain the remainder of key B from service computing device 130, it won't be able to correctly derive the complete key B because it will be using an incomplete portion of key B and a remainder portion of key B derived at two different times such that one will have been changed differently than the other, which will not result in the correct key B.

At step 207, the recipient computing device 120 combines the incomplete cryptographic key B portion received at step 203 with the remainder of the cryptographic key B portion obtained from the service at step 205 to assemble the complete cryptographic key B.

At step 208, the recipient computing device 120 uses the complete cryptographic key B and the received key C to derive the decryption key.

In embodiments, such as in symmetrical encryption schemes, the decryption key derived is a mirror to key A ("decryption key A").

In other embodiments, the decryption key ("key D") is a decryption key that corresponds to key A's encryption key. For example, in a public key-private key version of these embodiments, the key D would be private key and key A the public key.

In embodiments, the cryptographic key B is a public key and cryptographic key C is a private key. In these embodiments, it is the combination of the public key B and private key C that results in the derived key D.

At step 209, the recipient then uses the generated decryption key (e.g., decryption key A or key D, depending on embodiments) to decrypt the encrypted message.

In embodiments, the complete cryptographic key B is a quasi-prime number. In these embodiments, the incomplete version of the cryptographic key B sent by the sending computing device 110 to the receiving computing device 120 is a prime number that is a factor of the quasi-prime number. Correspondingly, the remainder of the cryptographic key B that is sent by the service computing device 130 to the receiving computing device 120 is a prime number that is the other factor of the quasi-prime number.

In a variation of these embodiments, the incomplete version of the cryptographic key B is a truncated version of the prime number that is a factor of the quasi-prime number.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of encrypting and decrypting a message, comprising:
   an encrypting computing system using a first cryptographic key to encrypt the message;
   a sending computing system sending the encrypted message to a receiving computing system;
   the sending computing system sending a third cryptographic key to the receiving computing system, wherein the third cryptographic key is sent in a separate transmission from the encrypted message;
   the receiving computing system obtaining first and second parts of a second cryptographic key;
   the receiving computing system using a decryption key derived from both the second cryptographic key and the third cryptographic key to decrypt the message; and
   wherein the receiving computing system receives the first part of the second cryptographic key from a first source, and the second part of the second cryptographic key from a second source different from the first source; and
   wherein the first part of the second cryptographic key is changed by the first source by a first predetermined factor according to a predetermined schedule and the second part of the second cryptographic key is changed by the second source by a second predetermined factor according to the predetermined schedule, wherein the second cryptographic key, derived from the changed first part and the changed second part both received according to the predetermined schedule by the receiving computing system, remains unchanged.

2. The method of claim 1, wherein the first part of the second cryptographic key further comprises at least one of:
   a truncated version of the second cryptographic key; and
   a divided version of the second cryptographic key.

3. The method of claim 1, wherein the second cryptographic key is a quasi-prime number, and the first part of the second cryptographic key is a first prime number that is a factor of the quasi-prime number.

4. The method of claim 3, wherein the first part of the second cryptographic key is a truncated version of the first prime number.

5. The method of claim 3, wherein the second source comprises the sending computing device and the second part of the second cryptographic key comprises a second prime number that is a second factor of the quasi-prime number.

6. The method of claim 1, wherein the second cryptographic key comprises a public key and the third cryptographic key comprises a private key.

7. The method of claim 6, wherein the decryption key comprises a second private key.

8. The method of claim 1, wherein the first cryptographic key and the decryption key are symmetrical cryptographic keys.

9. The method of claim 5, further comprising changing the first part of the second cryptographic key to a third prime number and the second part of the second cryptographic key to a fourth prime number, wherein the third prime number and fourth prime number are both factors of the quasi-prime number.

10. The method of claim 1, wherein the first source comprises the sending computing system.

\* \* \* \* \*